United States Patent
Cymbal et al.

(10) Patent No.: US 7,896,395 B2
(45) Date of Patent: Mar. 1, 2011

(54) STEERING COLUMN HAVING AN ACTUATOR FOR APPLYING A RESULTANT FORCE

(75) Inventors: William D. Cymbal, Freeland, MI (US); Richard K. Riefe, Saginaw, MI (US); Ravi Ravindra, Saginaw, MI (US)

(73) Assignee: Nexteer (Beijing) Technology Co., Ltd.

( * ) Notice: Subject to any disclaimer, the term of this patent is extended or adjusted under 35 U.S.C. 154(b) by 187 days.

(21) Appl. No.: 12/186,238

(22) Filed: Aug. 5, 2008

(65) Prior Publication Data
US 2010/0032933 A1 Feb. 11, 2010

(51) Int. Cl.
*B62D 1/00* (2006.01)
(52) U.S. Cl. .............. 280/777; 74/492; 74/493
(58) Field of Classification Search .......... 280/775, 280/777; 74/492, 493
See application file for complete search history.

(56) References Cited

U.S. PATENT DOCUMENTS

| | | | |
|---|---|---|---|
| 5,517,877 A | 5/1996 | Hancock | |
| 5,803,496 A * | 9/1998 | Cymbal | 280/777 |
| 6,116,648 A | 9/2000 | Holly et al. | |
| 6,152,488 A | 11/2000 | Hedderly et al. | |
| 6,189,929 B1 * | 2/2001 | Struble et al. | 280/777 |
| 6,224,104 B1 * | 5/2001 | Hibino | 280/777 |
| 6,234,528 B1 | 5/2001 | Ben-Rhouma et al. | |
| 6,264,240 B1 | 7/2001 | Hancock | |
| 6,322,103 B1 | 11/2001 | Li et al. | |
| 6,575,497 B1 * | 6/2003 | McCarthy et al. | 280/777 |
| 6,578,872 B2 | 6/2003 | Duval et al. | |
| 6,641,167 B2 | 11/2003 | Riefe et al. | |
| 6,655,716 B2 * | 12/2003 | Riefe | 280/777 |
| 6,908,110 B2 | 6/2005 | Ross et al. | |
| 7,125,047 B2 * | 10/2006 | Lee | 280/777 |
| 7,156,420 B2 * | 1/2007 | Ben Rhouma et al. | 280/777 |
| 7,219,927 B2 * | 5/2007 | Lee | 280/777 |
| 7,325,834 B2 * | 2/2008 | Manwaring et al. | 280/777 |
| 2006/0033321 A1 | 2/2006 | Manwaring et al. | |

FOREIGN PATENT DOCUMENTS

WO WO03033328 A2 4/2003

OTHER PUBLICATIONS

European Search Report and Office Action dated Oct. 7, 2009 for European Application No. 09165652.0.

* cited by examiner

*Primary Examiner*—Toan C To
(74) *Attorney, Agent, or Firm*—Cantor Colburn LLP

(57) ABSTRACT

The invention provides for a collapsible steering column assembly and method for applying a varying resultant force to resist the collapse of the steering column assembly during an emergency condition. The steering column assembly includes a column jacket adapted to be releasably coupled to the frame for movement along the longitudinal axis L in the emergency condition. The column jacket includes an anvil and is supported by a support bracket. An absorbing strap secured to the supporting bracket is routed around the anvil. The absorbing strap is plastically deformed as the column jacket moves along axis L and an actuator supported by the support bracket applies a force against the absorbing strap. The actuator selectively varies the applied for as the absorbing strap is drawn over the anvil in the emergency condition to optimize the resultant force for the emergency condition.

22 Claims, 4 Drawing Sheets

STEERING COLUMN HAVING AN ACTUATOR FOR APPLYING A RESULTANT FORCE

BACKGROUND OF THE INVENTION

1. Field of the Invention

This application relates generally to steering columns, and more specifically, to applying a resultant force required to resist collapse of a collapsible steering column during an emergency condition.

2. Description of Related Art

Automotive steering columns are typically collapsible and equipped with kinetic energy absorption devices that employ some device to create a resultant or resisting force to the collapse of the steering column. The resultant force reduces injury to a vehicle operator caused by the operator impacting a steering wheel as a result of an emergency condition, i.e., a collision. Such impacts during vehicle collision typically cause the steering column to collapse and a resultant force by resisting the collapse of the steering column absorbs the energy transmitted through the steering column.

Such collapsible steering column assemblies generally include a column that translates linearly and collapses during the emergency condition. A force generated by the driver impacting the steering wheel initiates the collapse by releasing the column. The column moves against the resultant force that may be produced by an energy absorption device designed to convert a portion of the driver's kinetic energy into work. The resultant force may be generated by systems including a plastically deformable metal element incorporated into the energy absorbing device. Such energy absorbing devices have a set resultant force or fixed energy absorption capability, and offer no control to vary the absorption capability over their performance during the collapse of the steering column assembly. More specifically, traditional energy absorbing devices have a fixed resultant force which is optimized to protect a given and limited group of drivers. In most cases the group represents an average size male driver.

In order to provide some adjustability at the initial determination of the emergency condition or collapse of the steering column, devices have been developed to produce a stage-variable resultant force. Typically, these devices utilize a pyrotechnic device incorporated into the collapsible steering column assembly. The pyrotechnic device selectively engages any number of a plurality of energy absorption devices disposed within the steering column assembly. Such a steering column assembly is disclosed in U.S. Pat. No. 6,578,872 to Duval et al. Steering column assemblies including the pyrotechnic devices allow for the energy absorption curve of the resultant force to be customized to match for example attributes of the driver and the severity of the emergency condition. However, variability of the energy absorption curve or the resultant force is based on engaging zero, one, two, etc. energy absorption devices disposed within the steering column assembly. The amount of energy absorbed by each individual energy absorption device does not vary. A variation in the absorption curve is achieved by changing the number of absorption devices utilized during the emergency condition. In addition, the pyrotechnic devices offer no variability to the energy absorption curve or the resultant force needed to collapse the steering column after the initiation of the emergency condition and the activation of the pyrotechnic device. Therefore, the pyrotechnic devices can not compensate or adjust the resultant force throughout the collapse of the steering column during the emergency condition.

Accordingly it would be desirable to develop a device that can apply and vary a resultant force needed to collapse the steering column assembly during the emergency condition and through out an entire emergency condition.

SUMMARY OF THE INVENTION AND ADVANTAGES

The invention provides for a collapsible steering column assembly and method for applying a resultant force. The steering column comprises of a column jacket defining a longitudinal axis and adapted to be releasably coupled to a frame for movement along the axis. The column jacket includes an anvil. A stationary bracket is adapted to be coupled to the frame for supporting the column jacket during normal operation and during an emergency condition as the column jacket moves relative to the stationary bracket. An absorbing strap includes a first end engaged to the stationary bracket and a second end extends substantially along the axis with a portion between the ends being disposed about the anvil. An actuator is coupled to the stationary bracket and engages the absorbing strap. The actuator engages the absorbing strap as the absorbing strap is being drawn over the anvil during an emergency condition and applies a resultant force required to move the column jacket relative to the stationary bracket during the emergency condition.

Accordingly, the invention addresses problems of the prior art systems by controlling the resultant force by an actuator applying a force in proportion to the desired resultant force throughout the emergency condition, thereby optimizing the movement of the column jacket. In addition, the invention does not require additional hydraulic or dampening systems and multiple absorbing straps.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
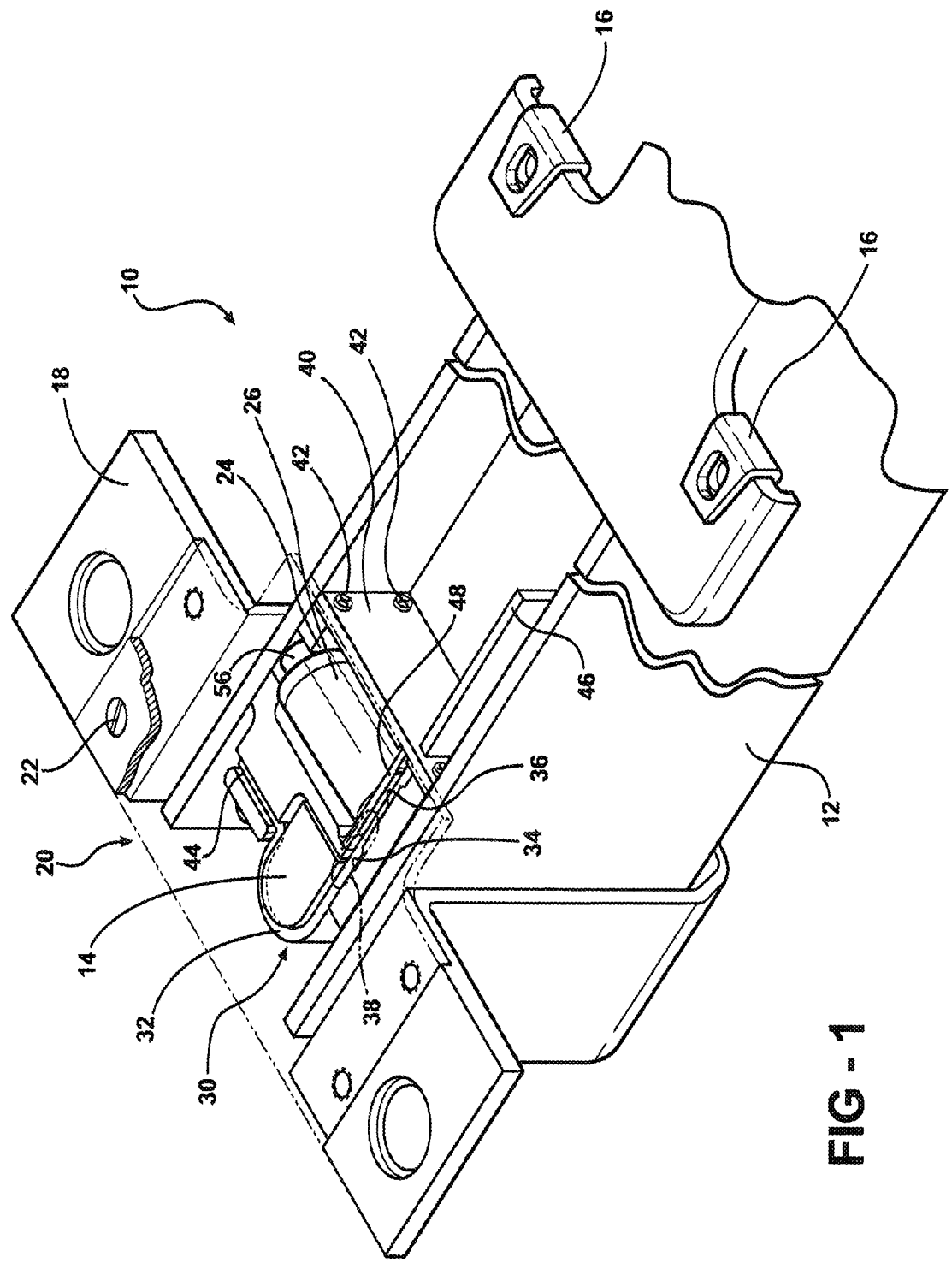
FIG. 1 is a fragmented perspective view of a steering column assembly according to the subject invention.

Referring to the Figures, wherein like numerals indicate like or corresponding parts throughout the several views, a collapsible steering column assembly is shown generally at 10 in FIG. 1. The steering column assembly 10 is incorporated into a vehicle (not shown) as is well known in the art.

Figure 2:
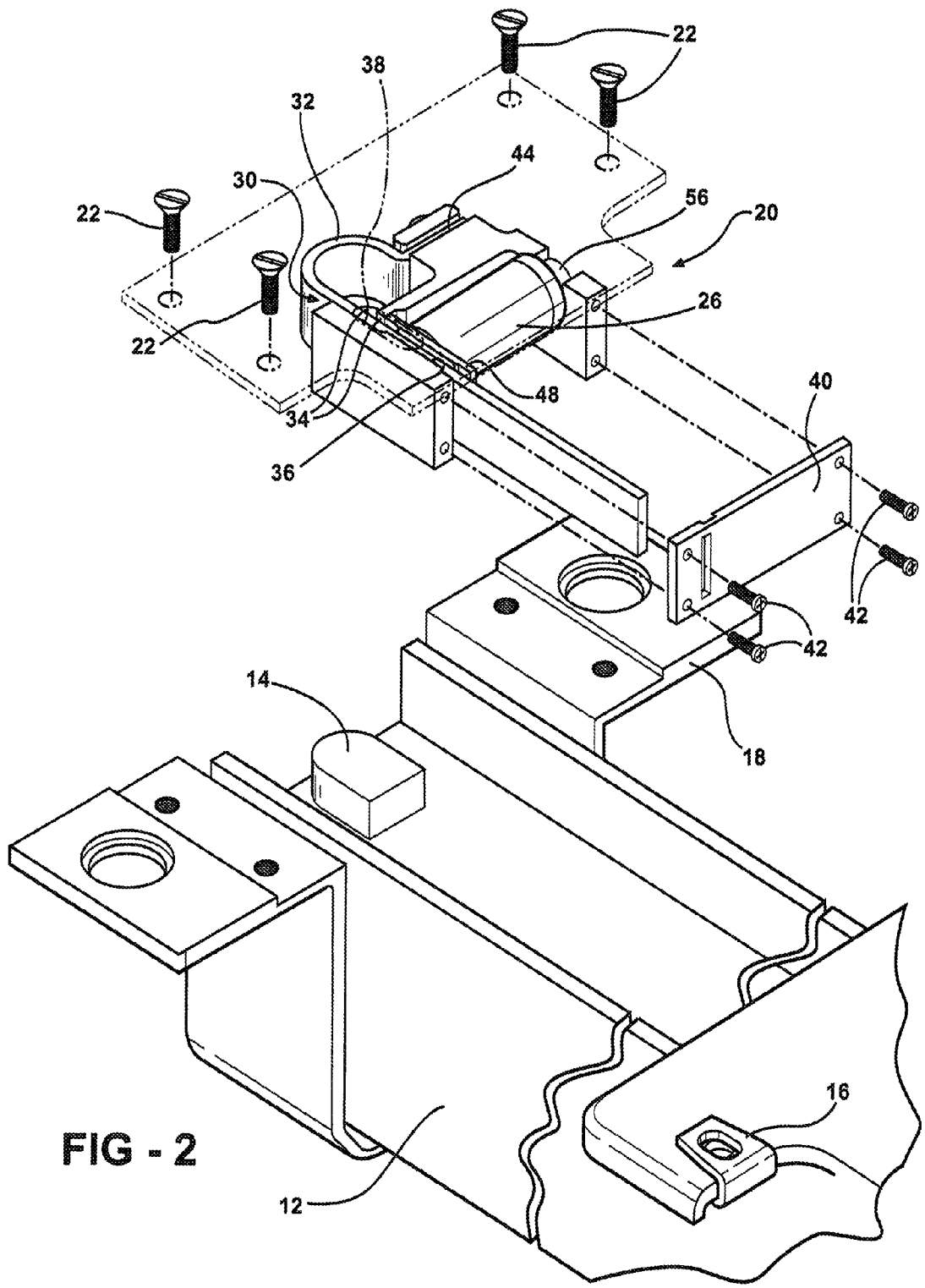
FIG. 2 is an exploded fragmented perspective view of the steering column assembly.

As shown in FIGS. 1 and 2, the steering column assembly 10 includes a column jacket 12 that defines a longitudinal axis L. The column jacket 12 is adapted to be releasably coupled to a frame (not shown) of the vehicle for movement along the longitudinal axis L. The column jacket 12 further includes an anvil 14, as will be further discussed below. The column jacket 12 is releasably coupled to the frame of the vehicle by at least one release capsule 16. The release capsule 16 is well known in the art. In the illustrated embodiment, there is a pair of release capsules 16. Each release capsule 16 couples the column jacket 12 to the frame via a plurality of sheer pins (not shown). The shear pins are fractured during the emergency condition, i.e. collision, due to a force applied against the steering column assembly 10. The release capsules 16 release the column jacket 12 from the frame during the emergency condition and the column jacket 12 moves along the longitudinal axis L in a direction as indicated by an arrow in FIG. 1. However, it should be appreciated that the release capsule 16 may be coupled to the column jacket 12 in any other suitable fashion and that sheer pins are just one example used in the art.

The steering column assembly 10 further includes a stationary bracket 18. The stationary bracket 18 is adapted to couple to the frame of the vehicle, as is generally known in the art. The stationary bracket 18 supports the column jacket 12 during normal operation and during the movement of the column jacket 12 during the emergency condition. The column jacket 12 during the emergency condition moves along the longitudinal axis L relative to the stationary bracket 18. The stationary bracket 18 in the illustrated embodiment includes a housing portion 20 that is secured to the stationary bracket 18 by a plurality of fasteners 22. The housing portion 20 defines a cavity 24 for supporting an actuator 26 and the cavity 24 may further define a recession 28 to guide the movement of the actuator 26, as will be further discussed below. The housing portion 20 is coupled to the stationary bracket 18 and defines a channel 30 for routing an absorbing strap 32. The channel 30 has two opposing walls 34 and one of the opposing walls 34 opens into the cavity 24 while the other opposing wall 34 extends opposing the cavity 24 to define a reaction surface 36. The reaction surface 36 may be machined to provide various frictional coefficients. The various frictional coefficients changes the frictional force and thereby the resultant force as the actuator 26 applies a force clamping the absorbing strap 32 between the actuator 26 and the reaction surface 36 during the emergency condition, as will be further discussed below. The housing portion 20 also incorporates a cut-out 38 to allow for visually verifying that the absorbing strap 32 is properly routed through the channel 30. The housing portion 20 may further include a backing 40 for closing off the cavity 24 along with a plurality of bolts 42. The backing 40 may varying in thickness to provide additional strength against torsional forces that may cause rotational flexing during the emergency condition. The bolts 42 may further act as reinforcement structures to add additional rigidity to the housing portion 20. It would be appreciated that the stationary bracket 18 may incorporate the housing portion 20 into a single unit; however, manufacturing and assembly limitations may require several components to be secured together to jointly make-up the stationary bracket 18, as in the illustrated embodiment. Additionally, the housing portion 20 may be secured to the stationary bracket 18 utilizing a variety of method sufficient to withstand the forces exerted on the stationary bracket 18 during the emergency condition.

The absorbing strap 32 includes a first end 44 and a second end 46. The first end 44 of the absorbing strap 32 is secured to the stationary bracket 18 or in the illustrated embodiment attached to the housing portion 20. The absorbing strap 32 is secured by various fasteners 22, such as a screw. However, one skilled in the art would appreciate that the absorbing strap 32 may be held in engagement with the stationary bracket 18 or housing portion 20 by various techniques sufficient to maintain the first end 44 of the absorbing strap 32 secured to the stationary bracket 18. The absorbing strap 32 includes a portion disposed about the anvil 14. The absorbing strap 32 is routed through the channel 30 such that the second end 46 of the absorbing strap 32 extends substantially along the axis L past the housing portion 20 of the stationary bracket 18. In the emergency condition, as the column jacket 12 releases from the frame the absorbing strap 32 is drawn over the anvil 14 and the absorbing strap 32 is deformed and/or elongated about the anvil 14 providing the resultant force to resist the movement of the column jacket 12 during the emergency condition.

The actuator 26 is disposed in the cavity 24 of the housing portion 20 of the stationary bracket 18. The actuator 26 engages against the absorbing strap 32. The actuator 26 extends a distance transverse to the longitudinal axis L as the absorbing strap 32 is being drawn over the anvil 14 during the emergency condition. The actuator 26 applies the force against the absorbing strap 32 for applying and varying the resultant force to resist the movement of the column jacket 12 relative to the stationary bracket 18 during the emergency condition.

Figure 3:
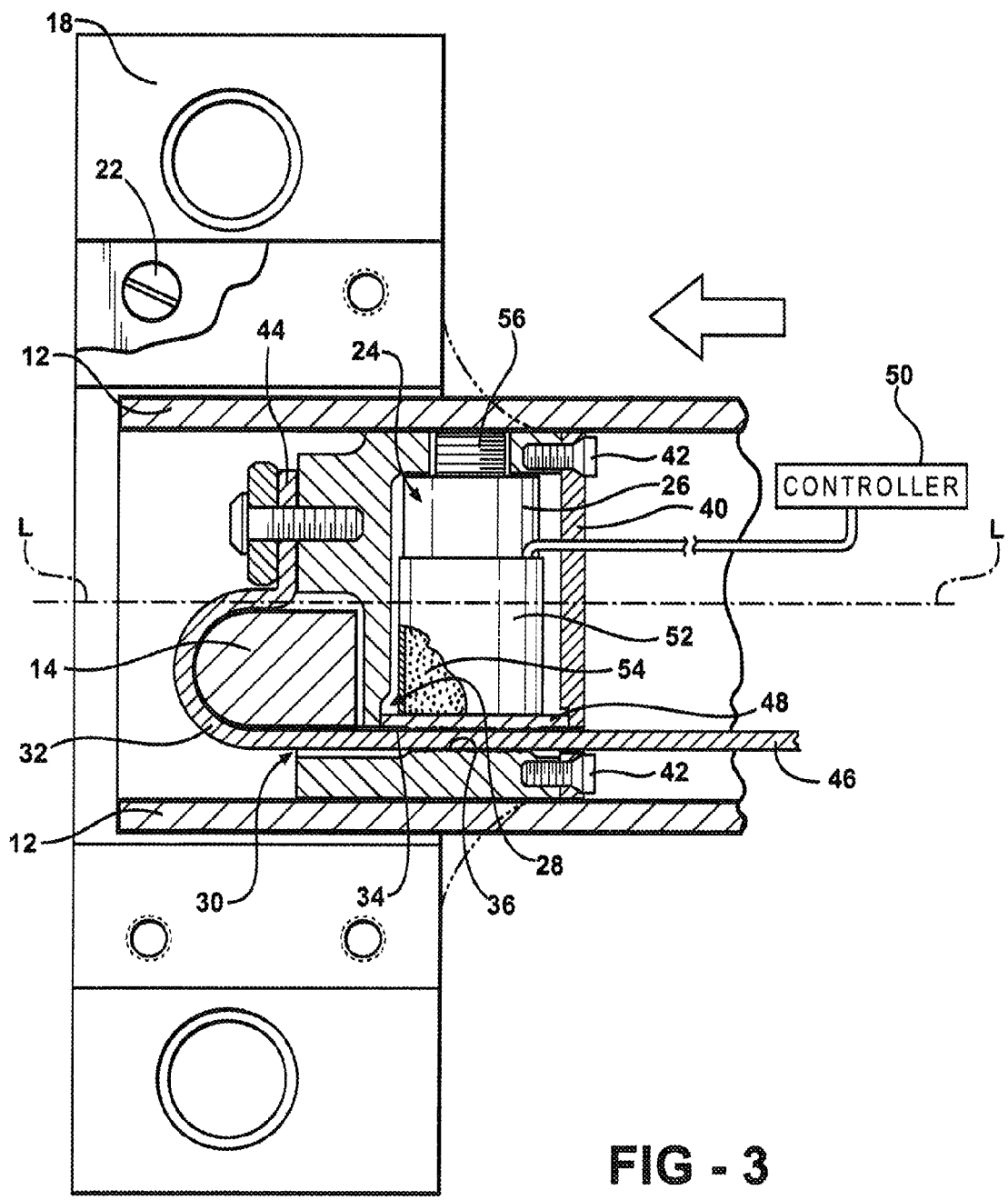
FIG. 3 is a sectional top view of the steering column assembly.
Figure 4:
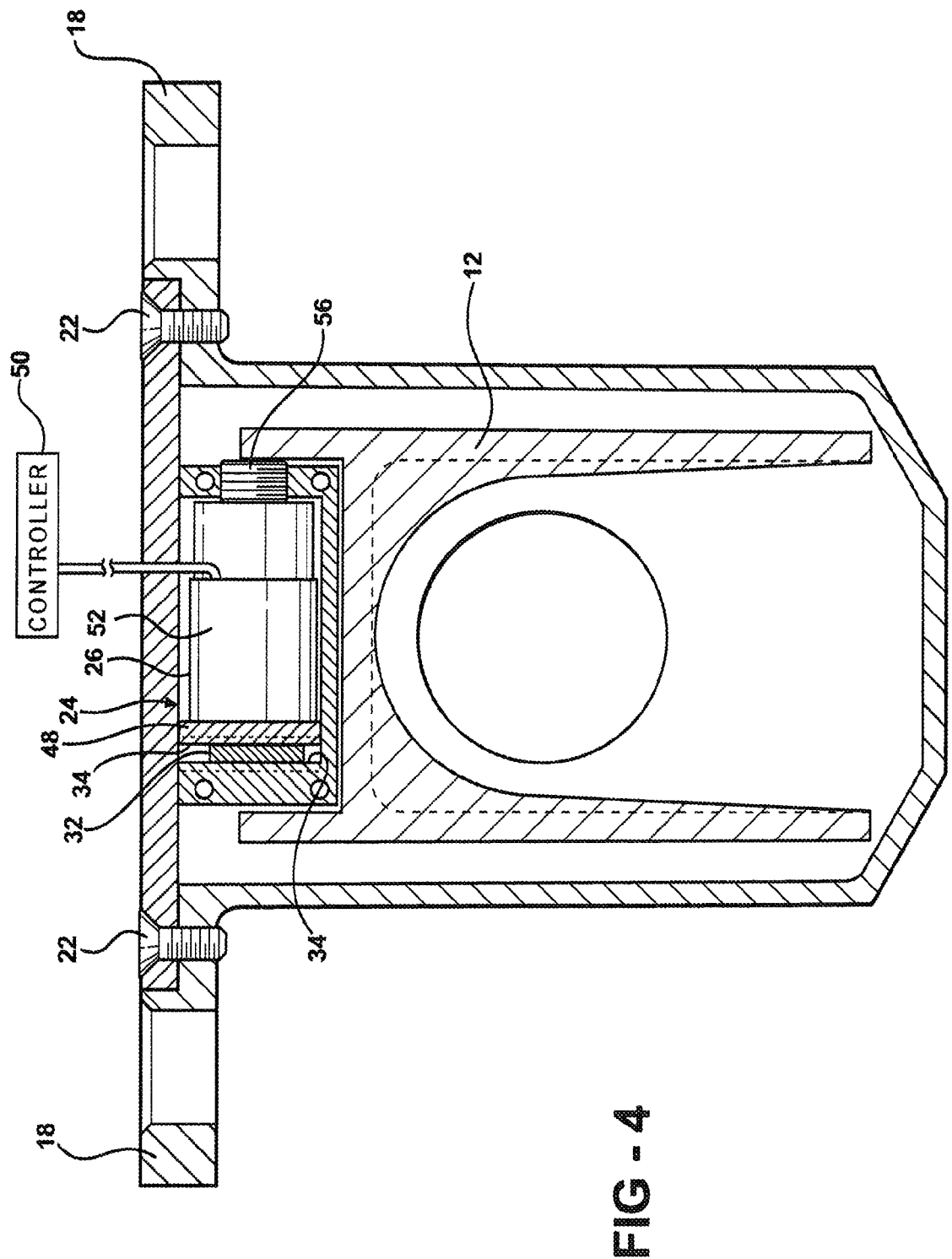
FIG. 4 is a cross-sectional view of the steering column assembly.

As best shown in FIGS. 3 and 4, the actuator 26 may further include a compression plate 48. The compression plate 48 is guided by the recession 28 of the housing portion 20 of the stationary bracket 18. The compression plate 48 is slidably allowed to move transverse to the axis L within the recession 28. The recession 28 secures the compression plate 48 to prevent lateral movement of the compression plate 48 along the axis L. The recession 28 minimizes the sheer forces exerted against the actuator 26 due to movement of the absorbing strap 32 during the emergency condition. The compression plate 48 is dispose within the cavity 24 and aligned opposing the reaction surface 36 with the absorbing strap 32 passing between the compression plate 48 and the reaction surface 36.

The steering column assembly 10 further includes a controller 50 that is electrically connected to the actuator 26 for activating the actuator 26 to apply the resultant force during the emergency condition. The controller 50 selectively activates the actuator 26 to move the compression plate 48 against the absorbing strap 32 to vary the resultant force. In one embodiment, the controller 50 activates the actuator 26 to vary the resultant force between a plurality of stages. A first stage resultant force is a minimal resultant force, typically tuned to approximately 600 lbs. of resistance. A second stage resultant force is greater than the resultant force of the first stage. The additional force of the second stage resultant force is created by the controller 50 activating the actuator 26 to move the compression plate 48 further against the absorbing strap 32. The actuator 26 applies the force against the absorbing strap 32 thereby adding a frictional force caused by the engagement between the absorbing strap 32, the reaction surface 36 and the compression plate 48 to vary the resultant force. The second stage resultant force is typically tuned to approximately 800 lbs. of resistance. A third stage resultant force is greater than the resultant force of the second stage by the controller 50 actuating the actuator 26 to apply an increase additional force against the absorbing strap 32. The third stage resultant force is typically tuned to approximately 1,000 lbs. of resistance increased above the second stage by the additional frictional force exerted on the absorbing strap 32 by the actuator 26. In addition, the controller 50 may optionally vary the actuation of the actuator 26 to continuously vary the resultant force at any interval or increment thereby optimizing the resultant force during and throughout the emergency condition.

As shown in FIG. 3 the actuator 26 is further defined as a piezoelectric actuator 52 having a piezoelectric material 54. The piezoelectric material 54 extends a distance transverse to the axis L in response to the signal from the controller 50. As previously discussed the controller 50 determines the optimal resultant force and signals the actuator 26 to move the compression plate 48 against the absorbing strap 32 to vary the resultant force. The controller 50 applies an electrical field across the piezoelectric actuator 52 and the piezoelectric material 54 extends a distance in response to the electrical field. The controller 50 selectively varies the electrical field to change the extended distance of the piezoelectric material 54 to vary the resultant force during the emergency condition. The piezoelectric material 54 responds in a linear relationship to the strength of the electric field applied across the piezoelectric actuator 52. The piezoelectric material 54 is unique having a characteristic of quickly responding to any variation in the electric field or the signal from the controller 50. Specifically, the quick response time of the piezoelectric material 54 allows the controller 50 to vary the resultant force continuously throughout the travel of the column jacket 12 during the emergency condition.

Referring to the Figures, the steering column assembly 10 further includes an adjustment device 56 coupled to the actuator 26. The adjustment device 56 pretensions the actuator 26 into contact with the absorbing strap 32. This is particularly important for the embodiments utilizing the piezoelectric actuator 52 since the distance the piezoelectric material 54 extends transverse to the axis L is relatively short. In the illustrated embodiments the adjustment device 56 is a setscrew. The setscrew is tightened to a set torque value to properly engage the actuator 26 against the absorbing strap 32. However, it would be understood by one skilled in the art that there are various adjustment devices 56, pre-tensioning devices and methods to adjust the actuator 26 within the cavity 24 to accommodate for manufacturing variations and tolerances.

In operation, the subject invention responds to a force, i.e., the driver thrown against the steering column assembly 10, causing the release capsules 16 to release the column jacket 12 from the frame. The controller 50 may be in communication with various systems and sensors throughout the vehicle to gather such variables as the direction and speed of the vehicle, the weight of the driver, and even in communication with the air bag and other active and passive safety systems to determine an optimized resultant force to resist the movement of the column jacket 12 when it is released from the frame. The controller 50 may further utilize additional information and be in communication with various systems within the vehicle to determine the resultant force optimized specific to the emergency condition. The controller 50 selectively actuates the actuator 26 via the signal to the actuator 26 as the absorbing strap 32 is drawn over the anvil 14 to apply the resultant force resisting movement of the column jacket 12 during the emergency condition. The controller 50 determines the optimal resultant force via the various sensors and variables of the emergency condition and may change the actuation of the actuator 26 during the emergency condition to continuously vary the resultant force to respond to changes throughout the entire emergency condition. Such continuous monitoring and changes is particularly advantageous to allow optimizing of the resultant force to dissipate the force caused by the emergency condition and reduce an immediate impact against the driver.

In an emergency condition where the vehicle power is lost the steering column assembly 10 is designed to employ the resultant force of the first stage resultant force as discussed above. However, the steering column assembly 10 may incorporate additional power retention systems or alternative power sources, i.e., capacitors or batteries, to allow for the control and operation of the actuator 26 during the emergency condition that includes a power failure of the vehicle.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings and the invention may be practiced otherwise than as specifically described.

What is claimed is:

1. A collapsible steering column assembly for use with a motor vehicle having a frame, said assembly comprising:
   a column jacket defining a longitudinal axis and adapted to be releasably coupled to the frame for movement along said axis;
   an anvil mounted to said column jacket;
   a stationary bracket adapted to be coupled to the frame for supporting said column jacket during normal operation of said column jacket and during an emergency condition with said column jacket moving relative to said stationary bracket;
   an absorbing strap having a first end engaged to said stationary bracket and a second end extending substantially along said axis with a portion between said ends being disposed about said anvil; and
   an actuator coupled to said stationary bracket and engaging said absorbing strap as said absorbing strap is being drawn over said anvil during an emergency condition for applying a resultant force required to move said column jacket relative to said stationary bracket during the emergency condition.

2. A collapsible steering column assembly as set forth in claim 1 further including a controller electrically connected to said actuator for activating said actuator to apply the resultant force during the emergency condition.

3. A collapsible steering column assembly as set forth in claim 2 wherein said actuator includes a compression plate slidably retained in said stationary bracket for movement transverse to said axis against said absorbing strap for applying the resultant force during the emergency condition.

4. A collapsible steering column assembly as set forth in claim 3 wherein said controller selectively activates said actuator to move said compressive plate against said absorbing strap to vary the resultant force between a plurality of stages.

5. A collapsible steering column assembly as set forth in claim 4 wherein said plurality of stages includes a first stage and a second stage with said second stage applying a greater resultant force than the first stage for varying the resultant force.

6. A collapsible steering column assembly as set forth in claim 5 wherein said plurality of stages further includes a third stage with said third stage applying a greater resultant force than said second stage.

7. A collapsible steering column assembly as set forth in claim 6 wherein said first stage and said second stage and said third stage are further defined as a resultant force approximately to 600 lbs and 800 lbs and 1,000 lbs respectively.

8. A collapsible steering column assembly as set from in claim 3 wherein said stationary bracket further defines a cavity for supporting said actuator and said cavity defines a recession to guide the movement of said compression plate transverse to said axis and to retain said compression plate to prevent lateral movement of said compression plate along said axis for minimizing the sheer forces against said actuator.

9. A collapsible steering column assembly as set forth in claim 8 wherein said actuator is further defined as a piezoelectric actuator having a piezoelectric material that extends a distance transverse to said axis in response to said signal from said controller for providing the movement of said compression plate against said absorbing strap.

10. A collapsible steering assembly as set forth in claim 9 wherein said controller applies an electrical field across said piezoelectric actuator.

11. A collapsible steering assembly as set forth in claim 10 wherein said controller selectively varies said electrical field to vary the resultant force the during the emergency condition.

12. A collapsible steering assembly as set forth in claim 8 wherein said stationary bracket further defines a channel having two opposing walls with said absorbing strap passing through said channel between said anvil and said second end of said absorbing strap.

13. A collapsible steering assembly as set forth in claim 12 wherein said channel opens into said cavity and one of said walls extends opposing said cavity to define a reaction surface and said reaction surface is opposing said compression plate.

14. A collapsible steering assembly as set forth in claim 13 wherein said reaction surface includes a surface finish for controlling the frictional force between said reaction surface and said absorbing strap.

15. A collapsible steering column assembly as set forth in claim 1 further including of an adjustment device coupled to said actuator to pretension said actuator into contact with said absorbing strap.

16. A collapsible steering column assembly as set forth in claim 15 wherein said adjustment device is further defined as a setscrew for engagement with said actuator to pretension said actuator against said absorbing strap.

17. A collapsible steering column assembly as set forth in claim 1 further including at least one release capsule releasably coupled to said column jacket for coupling said column jacket to the frame prior to the emergency condition and releasing said column jacket from the frame in response to the emergency condition moving said column jacket along said longitudinal axis.

18. A method of applying a resultant force required to collapse a steering column assembly of a vehicle during an emergency condition with the vehicle having a frame and the steering column assembly having a stationary bracket and a column jacket defining a longitudinal axis with an anvil, an absorbing strap, and an actuator, said method comprising the steps of:
  applying a force against the steering column assembly during the emergency condition;
  releasing the column jacket from the frame after the force is applied;
  moving the column jacket along the longitudinal axis relative to the stationary bracket;
  drawing the absorbing strap over the anvil as the column jacket moves along the longitudinal axis; and
  actuating the actuator as the absorbing strap is drawn over the anvil to apply a resultant force resisting movement of the column jacket relative to the stationary bracket during the emergency condition.

19. A method as set forth in claim 18 further including the step of varying the actuation of the actuator during the emergency condition to change the resultant force resisting the movement of the column jacket relative to the stationary bracket.

20. A method as set forth in claim 19 wherein the step of varying the actuator further comprises the step of changing an electrical field applied to the actuator to vary the movement of the actuator against the absorbing strap.

21. A method as set forth in claim 18 further including the step of extending the actuator a length transverse to the axis against the absorbing strap to apply the resultant force resisting the movement of the column jacket relative to the stationary bracket during the emergency condition.

22. A method as set forth in claim 18 further comprising the step of pretensioning the actuator against the absorbing strap.

* * * * *